(12) United States Patent
Choi et al.

(10) Patent No.: US 10,511,029 B2
(45) Date of Patent: Dec. 17, 2019

(54) METHOD FOR MANUFACTURING CATALYST SUPPORT, CATALYST SUPPORT MANUFACTURED THEREBY, AND CATALYST FOR FUEL CELL INCLUDING THE SAME

(71) Applicants: HYUNDAI MOTOR COMPANY, Seoul (KR); VINATECH CO., LTD., Jeonju-si, Jeollabuk-do (KR)

(72) Inventors: Jin Seong Choi, Yongin-si (KR); Bum Wook Roh, Seoul (KR); Seung Ho Yu, Daejeon (KR); Jin Su Hyun, Cheongju-si (KR); Han Gi Jeong, Seoul (KR)

(73) Assignees: HYUNDAI MOTOR COMPANY, Seoul (KR); VINATECH CO., LTD., Jeonju-si, Jeollabuk-do (KR)

( * ) Notice: Subject to any disclaimer, the term of this patent is extended or adjusted under 35 U.S.C. 154(b) by 222 days.

(21) Appl. No.: 15/366,440

(22) Filed: Dec. 1, 2016

(65) Prior Publication Data

US 2018/0062182 A1 Mar. 1, 2018

(30) Foreign Application Priority Data

Aug. 31, 2016 (KR) .................... 10-2016-0111782

(51) Int. Cl.
*H01M 4/92* (2006.01)
*H01M 8/1004* (2016.01)
(Continued)

(52) U.S. Cl.
CPC ......... *H01M 4/926* (2013.01); *H01M 4/8652* (2013.01); *H01M 4/8803* (2013.01);
(Continued)

(58) Field of Classification Search
None
See application file for complete search history.

(56) References Cited

U.S. PATENT DOCUMENTS

2007/0202392 A1* 8/2007 Faubert .................. H01M 4/92
429/483
2009/0208780 A1 8/2009 Sun et al.
(Continued)

FOREIGN PATENT DOCUMENTS

JP H06-140047 A 5/1994
JP H06-196174 A 7/1994
(Continued)

OTHER PUBLICATIONS

KR20100138423 English translation. Roh. Korea. Dec. 31, 2010. (Year: 2010).*

(Continued)

*Primary Examiner* — Christopher P Domone
(74) *Attorney, Agent, or Firm* — Morgan, Lewis & Bockius LLP

(57) ABSTRACT

A method for manufacturing a catalyst support includes: heat-treating a crystalline carbon support in a temperature range from 700° C. to 1100° C. under a vapor atmosphere to increase a specific surface area of the carbon support; and applying a magnetic field to the increased specific surface area of the carbon support to remove an impurity.

16 Claims, 7 Drawing Sheets

(51) Int. Cl.
*H01M 8/1018* (2016.01)
*H01M 4/88* (2006.01)
*H01M 4/86* (2006.01)

(52) U.S. Cl.
CPC ....... *H01M 4/8828* (2013.01); *H01M 4/8882* (2013.01); *H01M 8/1004* (2013.01); *H01M 8/1018* (2013.01); *H01M 2008/1095* (2013.01); *H01M 2300/0082* (2013.01)

(56) References Cited

U.S. PATENT DOCUMENTS

| | | | | |
|---|---|---|---|---|
| 2012/0028169 | A1* | 2/2012 | Roh | B01J 23/42 429/524 |
| 2012/0135137 | A1* | 5/2012 | Roh | B82Y 30/00 427/115 |
| 2012/0318675 | A1* | 12/2012 | Guillet | B82Y 30/00 205/122 |
| 2013/0087280 | A1* | 4/2013 | Lee | H01M 4/8663 156/308.2 |
| 2015/0210550 | A1 | 7/2015 | Sun et al. | |

FOREIGN PATENT DOCUMENTS

| | | | |
|---|---|---|---|
| JP | H06-102528 | B2 | 12/1994 |
| JP | 2001-357857 | A | 12/2001 |
| JP | 2009-292670 | A | 12/2009 |
| KR | 10-2010-0122082 | A | 11/2010 |
| KR | 20100138423 | * | 12/2010 |
| KR | 10-2012-0021408 | A | 3/2012 |
| KR | 10-1240971 | B1 | 3/2013 |
| KR | 10-2014-0044645 | A | 4/2014 |

OTHER PUBLICATIONS

JP H06102528 English translation. Kitahara et al. Japan. Jun. 28, 1990. (Year: 1990).*
Korean Office Action issued in Application No. 10-2016-0111782 dated Jan. 11, 2017.

* cited by examiner

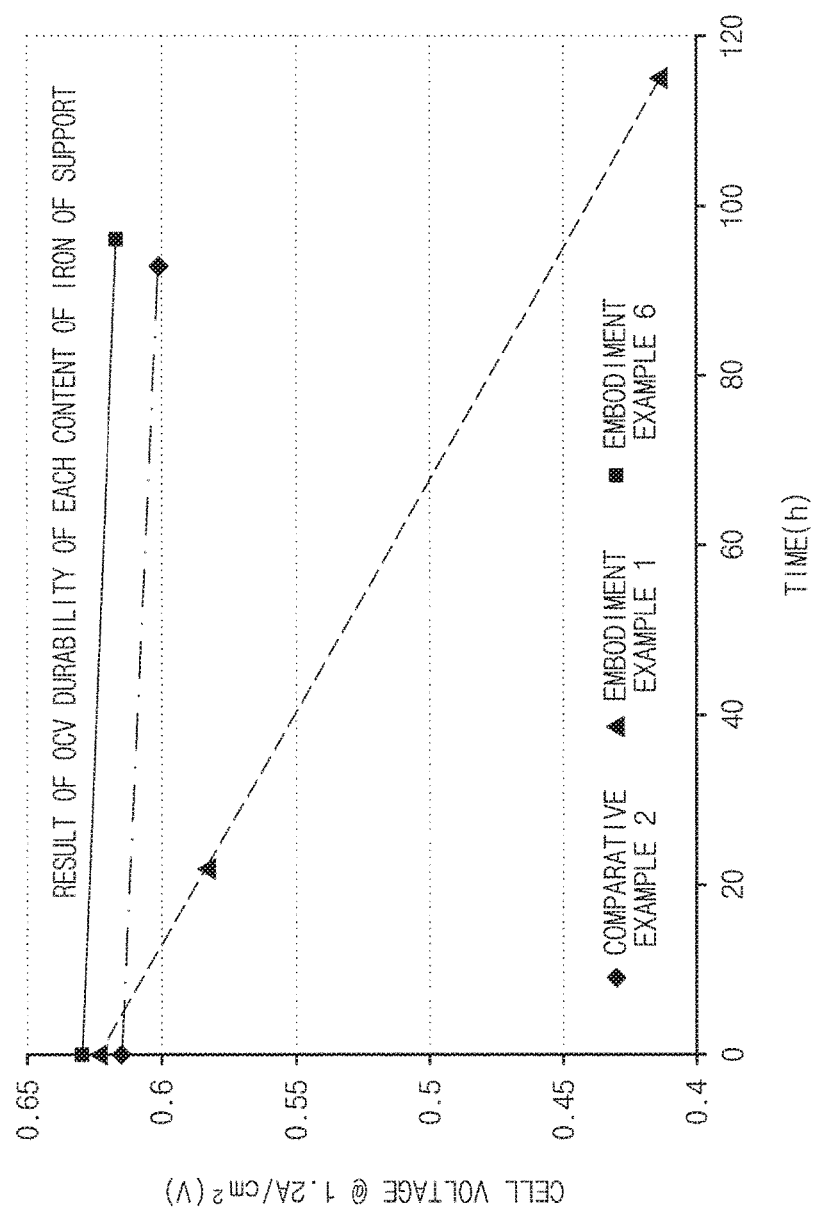

METHOD FOR MANUFACTURING CATALYST SUPPORT, CATALYST SUPPORT MANUFACTURED THEREBY, AND CATALYST FOR FUEL CELL INCLUDING THE SAME

CROSS-REFERENCE TO RELATED APPLICATION

This application is based on and claims the benefit of priority to Korean Patent Application No. 10-2016-0111782, filed on Aug. 31, 2016, in the Korean Intellectual Property Office, the disclosure of which is incorporated herein in its entirety by reference.

TECHNICAL FIELD

The present disclosure relates to a method for manufacturing a catalyst support, a catalyst support manufactured thereby, and a catalyst for a fuel cell including the same. More specifically, the present disclosure relates to a method for manufacturing a catalyst support, including heat-treating a crystalline carbon support under a vapor atmosphere and subsequently applying a magnetic field thereto, thus increasing a specific surface area of the carbon support, a catalyst support manufactured thereby, and a catalyst for a fuel cell including the same.

BACKGROUND

In general, a fuel cell refers to a device for converting chemical energy of fuel such as hydrogen, or the like, into electrical energy.

A fuel cell is based on an electrochemical reaction entailing transfer of electrons, and in a rate of the same electrochemical reaction, it is important to induce a reaction such that polarization is minimized, that is, an overvoltage is minimized, in an equilibrium potential.

To this end, a degree of dispersion of catalyst particles is required to be enhanced and the catalyst particles are required to have an optimal form to participate in a reaction.

When a fuel cell is driven, an operation potential region is generally present at 1.0 V to 0.4 V, and in case of carbon, a thermodynamic oxidation standard potential is 0.207VSHE, and thus, it is not possible to prevent generation of natural oxidation at a higher potential.

That is, the driving voltage condition of a fuel cell causes a high oxidation overvoltage with respect to carbon to instigate a poor damage atmosphere, and in addition, ambient air introduced to an anode during a process of starting and stopping a fuel cell is mixed with hydrogen, fuel, to cause a high potential of 1.2 VSHE or higher in carbon on the basis of a boundary thereof.

Such a condition accelerates a reaction rate of carbon corrosion to end up causing a critical problem of shortening lifespan of the fuel cell. That is, delaying the reaction may be an important factor to lengthen lifespan of the fuel cell.

Thus, in order to increase activity of a fuel cell catalyst, research into manufacturing platinum in nano-scale and research into supporting platinum in a carbon support having a high specific surface area in a high dispersion/high ratio have been variously conducted.

In general, carbon black is used as a carbon support. However, the use of carbon black as a carbon support during an operation of a fuel cell degrades durability of a catalyst due to carbon corrosion during the operation of a fuel cell.

In order to solve the problem, various studies have been made. For example, a method of graphitizing a carbon support having a high specific surface and subsequently increasing the specific surface area of the graphitized carbon support using vapor phase etching has been presented (please refer to Korean Patent Laid-open Publication. No. 2010-122082). In this case, however, crystallinity of carbon is varied over time of vapor phase etching.

Thus, in order to solve the problem, development of manufacturing a carbon support having a high specific surface area, while maintaining high crystallinity and excellent surface physical properties of carbon, is required.

The present disclosure has been made to solve the above-mentioned problems occurring in the prior art while advantages achieved by the prior art are maintained intact.

An aspect of the present disclosure provides a method for manufacturing a catalyst support capable of implementing high crystallinity and high specific surface area of a carbon support.

Another aspect of the present disclosure provides a carbon support capable of enhancing carbon corrosion durability of a catalyst, while maintaining excellent surface physical properties of a crystalline carbon support.

Another aspect of the present disclosure provides a fuel cell having enhanced durability and performance using a catalyst using the carbon support.

According to an exemplary embodiment of the present disclosure, a method for manufacturing a catalyst support the present disclosure includes: heat-treating a crystalline carbon support in a temperature range from 700° C. to 1100° C. under a vapor atmosphere to increase a specific surface area of the carbon support; and applying a magnetic field to the specific surface area-increased carbon support to remove an impurity.

According to another exemplary embodiment of the present disclosure; a catalyst support manufactured by a method which includes heat-treating a crystalline carbon support in a temperature range from 700° C. to 1100° C. under a vapor atmosphere to increase a specific surface area of the carbon support; and applying a magnetic field to the specific surface area-increased carbon support to remove an impurity.

In addition, the present disclosure provides a catalyst for a fuel cell including the catalyst support.

Moreover, the present disclosure provides an electrode including the catalyst for a fuel cell.

Furthermore, the present disclosure provides a fuel cell including the electrode.

BRIEF DESCRIPTION OF THE DRAWINGS

The above and other objects, features and advantages of the present disclosure will be more apparent from the following detailed description taken in conjunction with the accompanying drawings.

FIG. 7 is a graph of results obtained by evaluating open circuit voltage (OCV) durability using catalyst supports of exemplary embodiment and comparative example.

DETAILED DESCRIPTION

Figure 1A:
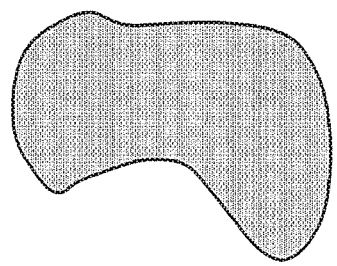
FIG. 1A is a view schematically illustrating a shape of a carbon support having high crystallinity/low specific surface area.

Hereinafter, exemplary embodiments of the present disclosure will be described in detail with reference to the accompanying drawings.

It should be appreciated that terms or words used in the specification and claims should not be limited and construed as common or dictionary meanings, and should be construed as meanings and concepts according to the technical spirit of the present disclosure based on the principle that the inventor can appropriately define the concept of each term for describing the present disclosure in the best way.

A method for manufacturing a catalyst support of the present disclosure includes: heat-treating a crystalline carbon support in a temperature range from 700° C. to 1100° C. under a vapor atmosphere to increase a specific surface area of the carbon support (S1); and applying a magnetic field to the specific surface area-increased carbon support to remove an impurity (S2).

According to the method for manufacturing a catalyst support according to an exemplary embodiment of the present disclosure, a high specific surface area and high crystallinity may be implemented, while maintaining surface physical properties of the crystalline carbon support, thus contributing to carbon corrosion durability of a catalyst, enhancement of quality of a fuel cell, and lengthening of lifespan.

The method for manufacturing a catalyst support according to an exemplary embodiment of the present disclosure will be described in detail by stages.

In the method for manufacturing a catalyst support according to an exemplary embodiment of the present disclosure, operation S1 may be an operation of heat-treating a crystalline carbon support within in a temperature range from 700° C. to 1100° C. under a vapor atmosphere to increase a specific surface area of the carbon support.

In general, in order to enhance performance and durability of a fuel cell, a catalyst support for a fuel cell having a higher specific surface area and higher crystallinity may be advantageous. However, a generally used highly crystalline carbon support is advantageous as a carbon support for a fuel cell, but it has relatively low specific surface area. In order to increase the specific surface area, various post-processing is known, but after post-processing crystallinity of the carbon support may be reduced or unique surface physical properties of the carbon support may be reduced.

According to an exemplary embodiment of the present disclosure, a heat treatment may be performed at a specific high temperature range under a hydrogen atmosphere in order to enhance specific surface area, without changing high crystallinity and surface physical properties of the carbon support in operation S1.

According to an exemplary embodiment of the present disclosure, a supply amount of vapor ranges from 1 L/h to 30 L/h, or 5 L/h to 20 L/h. In a certain embodiment, a nitrogen gas is continuously supplied as a carrier gas by heating an ultrapure water tank at 100° C. or higher during the heat treatment.

If the amount of vapor is less than the foregoing range, a specific surface area enhancement effect may be small, and when the amount of vapor exceeds the foregoing range, yield and crystallinity may be degraded, and in particular, the degradation of crystallinity may negatively affect a service life of a fuel cell.

The heat treatment may be performed within a temperature range, preferably, from 700° C. to 1100° C. or from 950° C. to 1050° C. for 5 to 20 hours or 9 to 13 hours.

According to an exemplary embodiment of the present disclosure, by performing heat treatment within the foregoing range, a specific surface area may be enhanced according to supply of vapor, without changing surface physical properties of the carbon support.

In detail, according to the method for manufacturing a catalyst support of the present disclosure, the carbon support may undergo a partial oxidation process through high temperature heat treatment under the vapor atmosphere, whereby the carbon support may have a high specific surface area.

Figure 1B:
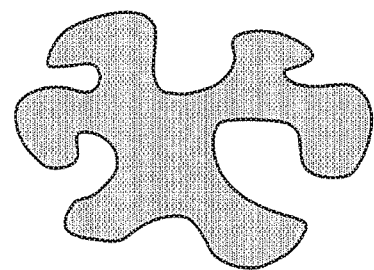
FIG. 1B is schematically illustrating a shape of a carbon support having high crystallinity/high specific surface area.

For example, FIGS. 1A and 1B are conceptual schematic views regarding a change in a shape before and after high temperature heat treatment under the vapor atmosphere according to an exemplary embodiment the present disclosure.

FIG. 1A schematically illustrates a shape of a crystalline carbon support before a high temperature heat treatment under a vapor atmosphere, and FIG. 1B schematically illustrates a shape of a crystalline carbon support after high temperature heat treatment under a vapor atmosphere. As can be seen from FIGS. 1A and 1B, a specific surface area may be enhanced through a heat treatment under a vapor atmosphere regarding a crystalline carbon support.

According to an exemplary embodiment of the present disclosure, a specific surface area of the carbon support before a heat treatment under the vapor atmosphere is 80 to 120 $m^2/g$, while a specific surface area of the carbon support after a heat treatment under the vapor atmosphere is 200 to 700 $m^2/g$ or 250 to 450 $m^2/g$, representing an increase of 300 to 450%. If the specific surface area of the carbon support before a heat treatment under the vapor atmosphere exceeds the foregoing range, physical properties of the carbon support may be changed, and in particular, a distance between d002 planes may be increased to degrade carbon corrosion durability.

According to an exemplary embodiment of the present disclosure, a specific surface area of the carbon support may be measured through a Brunauer-Emmett-Teller (BET) method. For example, the specific surface area of the carbon support may be measured by a 6-point BET method according to a nitrogen gas adsorption-flow method using a porosimetry analyzer (Belsorp-II mini by Bell Japan Inc.).

According to an exemplary embodiment of the present disclosure, an orientation index represents a value when a crystal structure of the carbon support is arranged in a predetermined direction, and may be measured by XRD. In detail, XRD measurement conditions are as follows:

Target: Cu(Kα-line) graphite monochromator

Slit: divergence slit=1 degree, receiving slit=0.1 mm, scattering slit=1 degree

Measurement range and step angle/measurement time:
d002 plane: 21.5°<2θ<30.0°, 0.01°/3 seconds, where 2θ represents a diffraction angle.

Further, an interlayer distance (d002) of the carbon support may be calculated by Equation 1 on the basis of Bragg's formula by obtaining a graph of a 2θ value measured using an X-ray diffraction method and obtaining a peak position of the graph by an integral calculus.

$$d_{002=\lambda/2} \sin \theta \qquad \text{[Equation 1]}$$

As for a size Lc of a crystallite of the carbon support of the present disclosure, a size Lc of a crystallite of a particle in a c-axis direction and a size La of a crystallite of the particle in an a-axis direction may be calculated by the Scherrer equation of Equation 2 and Equation 3.

[Equation 2]

$$L_c = \frac{K\lambda}{\beta_{(2\theta)}\cos\theta}$$

K Scherrer constant (K=0.9)
β=half width
λ=wavelength (0.154056 nm)
θ=angle at maximum peak
[Equation 3]

$$L_a = \frac{K\lambda}{\beta_{(2\theta)}\cos\theta}$$

K=1.84
β=half width
λ=wavelength (0.154056 nm)
θ=angle at maximum peak

The XRD measurement is an example, and any other measurement method may also be used.

According to an exemplary embodiment of the present disclosure, since the crystalline carbon support, in particular, the highly crystalline (d002=034~0.36) carbon support is used to manufacture a catalyst support, durability regarding carbon corrosion may be further enhanced.

According to an exemplary embodiment of the present disclosure, the crystalline carbon support may include a spherical carbon material having an average particle diameter ranging from 0.1 µm to 500 µm.

According to another exemplary embodiment of the present disclosure, the crystalline carbon support may include a linear carbon material having an average diameter ranging from 1 nm to 200 nm and an average length ranging from 1 µm to 100 µm.

Also, according to another exemplary embodiment of the present disclosure, a mixture of a spherical carbon material having the average particle diameter and a linear carbon material may be used as the crystalline carbon support.

An average particle diameter of the carbon material according to an exemplary embodiment of the present disclosure may be measured using a laser diffraction method, for example. The laser diffraction method generally allows for measurement of a particle diameter from a submicron level to a few millimeters and obtains high repeatable and high resolution results. The average particle diameter $D_{50}$ of the carbon material may be defined as a particle diameter in a 50% reference of particle diameter distribution.

According to an exemplary embodiment of the present disclosure, the crystalline carbon support may include a carbon material selected from the group consisting of carbon black, an active carbon, carbon nano-tube (CNT), carbon fiber, graphite, and may include a carbon material selected from the group consisting of carbon black, CNT, and graphite.

In the method for manufacturing a catalyst support according to an exemplary embodiment of the present disclosure, operation S2 may be an operation of applying a magnetic field to the carbon support with an increased specific surface area to remove an impurity. According to an exemplary embodiment of the present disclosure, an impurity may be removed from the catalyst support of the present disclosure by applying a magnetic field in operation S2, whereby durability of the catalyst and fuel cell may be further enhanced.

According to an exemplary embodiment of the present disclosure, a strength of the magnetic field may range from 3,000 to 40,000 G, and, preferably, from 12,000 to 20,000 G.

If a strength of the magnetic field is less than the foregoing range, it may be difficult to remove an impurity of the support, reducing durability of a catalyst and a fuel cell.

Further, the magnetic field is applied, preferably, for a few seconds to a few minutes, for example, for 0.1 seconds to 10 minutes, or more specifically, for 0.5 to 30 seconds.

According to an exemplary embodiment of the present disclosure, impurities present before the magnetic field application may be those selected from the group consisting of iron (Fe), nickel (Ni), and an oxide assuming magnetism of the metal, and here, after a magnetic field is applied, the content of the impurities may be 3 wt % or less of the entire wt % of the catalyst support.

According to an exemplary embodiment of the present disclosure, after the magnetic field application, for example, whether the impurities were remove may be confirmed by an inductively coupled plasma (ICP) measurement machine. The present disclosure may provide a catalyst support manufactured by the method for manufacturing a catalyst support.

The catalyst support manufactured by the foregoing method according to an exemplary embodiment of the present disclosure may have high crystallinity and high specific surface area.

For example, a specific surface area (BET) of the carbon support may range from 200 to 700 $m^2/g$, or from 250 to 500 $m^2/g$.

According to an exemplary embodiment of the present disclosure, when the catalyst support having the specific surface area and crystallinity is used as a catalyst, carbon corrosion durability and performance of a fuel cell may be further enhanced. Thus, the present disclosure may provide a catalyst for a fuel cell including the catalyst support.

The catalyst for a fuel cell according to an exemplary embodiment of the present disclosure may include a carbon support and an active metal, and the active metal may be included in an amount of 0.1 to 60 parts by weight with respect to 100 parts by weight of the carbon support. The active metal may include any one selected from among platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium), tunsten (W), iridium (Ir), osmium (Os), rhodium (Rh), niobium (Nb), tantalum (Ta), zirconium (Zr), and lead (Pb), and a mixture of two or more thereof.

The present disclosure may provide an electrode including the catalyst for a fuel cell. The electrode may be an anode or a cathode, or a cathode.

The electrode may include a catalyst layer including a catalyst and an electrode substrate. Here, the electrode substrate serves to support the electrode and spread fuel and an oxidizing agent to the catalyst such that the fuel and the oxidizing to easily access the catalyst layer. As the electrode substrate, a conductive substrate is used. For example, carbon paper, carbon cloth, or carbon felt may be typically used, but the present disclosure is not limited thereto.

According to an exemplary embodiment of the present disclosure, the fuel cell may be a polymer electrolytic fuel cell. Thus, the present disclosure may provide a membrane electrode assembly (MEA) including the electrode and the polymer electrolytic membrane.

The MEA may be manufactured according to a general method used in the art, and, for example, the MEA may be completed by thermally compressing the anode and the cathode to a polymer electrolyte membrane. In detail, dried electrodes, i.e., the anode and the cathode, may be positioned at opposing ends of the polymer electrolyte membrane and thermally compressed to manufacture the MEA.

Here, in order to easily perform thermal compression, a temperature for the thermal compression may range from 100° C. to 180° C., a thermal compression time may range from 0.5 to 30 minutes, thermal compression pressure may range from 50 to 300 kgf/cm$^2$, and after the thermal compression, release paper may be removed to manufacture a final MEA.

The present disclosure may also provide a fuel cell system including the MEA.

The fuel cell system may be manufactured using a general method known in various documents in the art. The fuel cell may be applied various structures such as a tubular stack, a flat tubular stack, a planar type stack, and the like. The fuel cell system according to an exemplary embodiment of the present disclosure may include an MEA and separators positioned on opposing sides of the MEA, and may include at least one electricity generator generating electricity through oxidation of fuel and reduction of an oxidizing agent; a fuel supplier supplying the fuel to the electricity generator; and an oxidizing agent supplier supplying the oxidizing agent to the electricity generator.

Hereinafter, exemplary embodiments of the present disclosure will be described in detail with reference to the accompanying drawings. The exemplary embodiments may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

EMBODIMENT EXAMPLE

Hereinafter, embodiment examples and experimental examples will be described, but the present disclosure is not limited thereto.

Embodiment Example 1

<Manufacturing Catalyst Support>
Operation S1: Heat Treatment Under Vapor Atmosphere
Highly crystalline carbon black having an average particle diameter ranging from 1 μm to 100 μm was heat-treated at about 970° C. for 10 hours under a vapor atmosphere. Here, vapor was supplied at 12 L/h by a reactor using a nitrogen gas to a pre-heated water tank.

Here, a specific surface area (BET) of a carbon support after heat treatment under the vapor atmosphere was 450 m$^2$/g.

Operation S2: Application of Magnetic Field
The carbon support having a high specific surface area manufactured in operation S1 was allowed to pass through a sieve. The carbon support was allowed to pass through the sieve at 13,600 G for four times and 17,600 G for once to remove impurities. In each operation of the magnetic field application, the content of an iron impurity of the support was checked through ICP.

<Preparation of Catalyst>
A support catalyst including 50 wt % of a catalyst support having a highly crystalline and highly specific surface area and 50 wt % of platinum was prepared.

<Manufacturing MEA>
30 parts by weight of hyflon (solid 24.5%), a commercial binder (or a commercial ionomer), and 800 parts by weight of an isopropyl alcohol (IPA), a solvent, were mixed to prepare catalyst slurry for a cathode.

The catalyst slurry for a cathode was coated on a coating film substrate and subsequently dried at about 80° C. for about 2 hours to obtain a cathode.

The slurry prepared through the foregoing method was coated to have a thickness one-fourth that of the cathode to obtain an anode.

The cathode electrode, the anode electrode, and the commercial nafion (perfluorosulfonic acid) polymer electrolyte membrane were thermally compressed at 120° C. and 50 kgf/cm$^2$ to manufacture an MEA.

Embodiment Examples 2-6

A catalyst support, a catalyst, and an MEA were manufactured by performing the same method as that of Embodiment example 1, except that vapor was supplied under the conditions described in Table 1 and a magnetic field was applied.

Comparative Example 1

A catalyst support, a catalyst, and an MEA were manufactured, by performing the same method as that of Embodiment example 1, except that heat treatment was performed under a vapor atmosphere under the conditions described in Table and an operation of applying a magnetic field was not performed.

Comparative Example 2

An MEA was manufactured in the same manner as that of Embodiment example 1, except for the user of a commercial MEA of Gore™.

Comparative Example 3

A catalyst support, a catalyst, and an MEA were manufactured by performing the same method as that of Embodiment example 1, except for the use of Pt/C TKK catalyst (Tanaka Kikinzoku Kyogyo KK, Japan).

TABLE 1

| Example | Crystallinity of carbon support (d002) | Supply amount of vapor (unit/hour) | Application amount of magnetic field | Specific surface area of carbon support ($m^2/g$) | Type an content of impurity | Remark |
|---|---|---|---|---|---|---|
| Embodiment Example 1 | 0.348 nm | 12 L/h | Not applied | 450 | Fe: 285 ppm | |
| Embodiment Example 2 | 0.346 nm | 5 L/h | Not applied | 250 | Fe: 330 ppm | |
| Embodiment Example 3 | 0.348 nm | 20 L/h | Not applied | 700 | Fe: 1220 ppm | |
| Embodiment Example 4 | 0.347 nm | 12 L/h | 13,600 G twice | 450 | Fe: 160 ppm | |
| Embodiment Example 5 | 0.347 nm | 12 L/h | 13,600 G four times | | Fe: 153 ppm | |
| Embodiment Example 6 | 0.347 nm | 12 L/h | 13,600 G four times + 17,600 G once | | Fe: 55.6 ppm | |
| Comparative Example 1 | 0.346 nm | Not applied | Not applied | 80 | Fe: not detected | Before treatment |
| Comparative Example 2 | | | | | Fe: 83 ppm | |
| Comparative Example 3 | | | | | Fe: 158 ppm | |

Experimental Example 1

X-ray Diffraction Analysis

Figure 2:
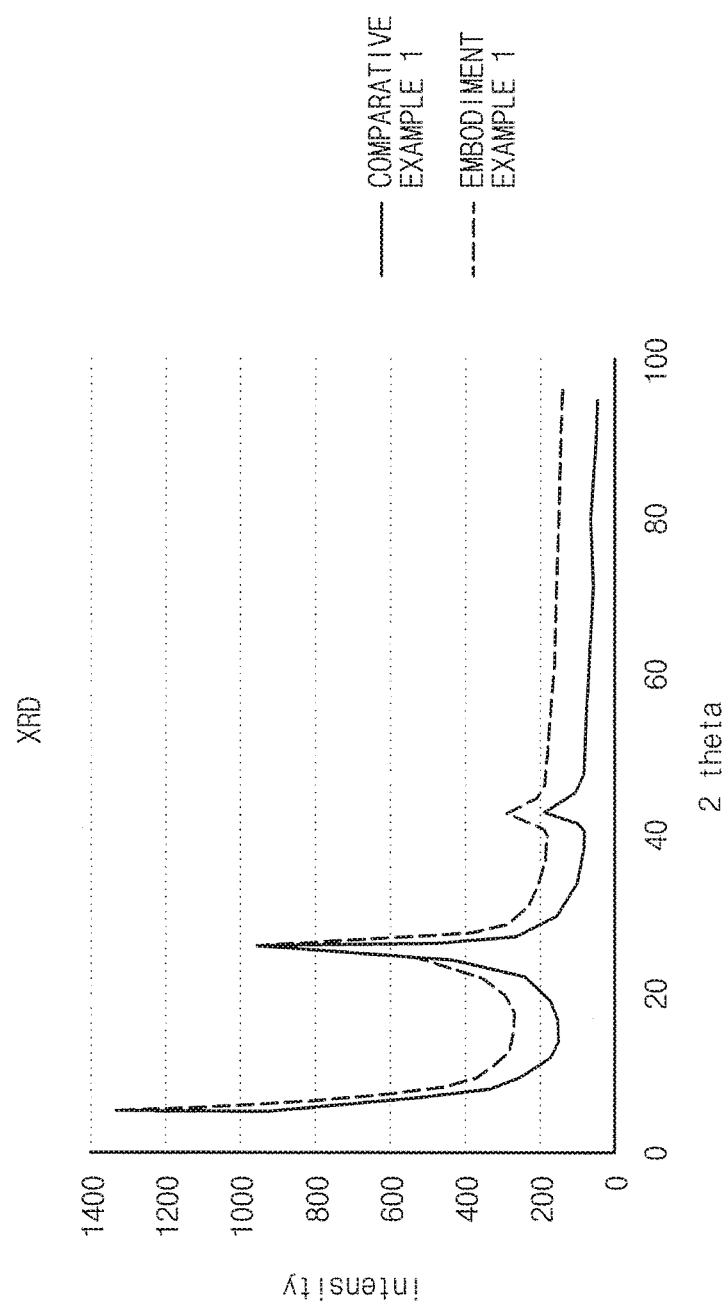
FIG. 2 is a graph of X-ray diffractometry (XRD) analysis results illustrating a change in XRD of a crystalline carbon support before and after high temperature heat treatment under a vapor atmosphere.

In the Embodiment Examples and Comparative Examples, X-ray diffraction (XRD) analyses before and after heat treatment under a vapor atmosphere were performed with value θ from 5° to 90°, and results thereof are illustrated in FIG. 2.

Experimental Example 2

Measurement of Inductively Coupled Plasma (ICP) Spectroscopy

In order to analyze the catalyst support obtained in the embodiment examples and comparative examples treated by strengths of magnetic field, analysis was performed for 20 seconds using ICP ULTIMA-2 and a calibration curve was prepared by a standard addition by selecting an analysis wavelength of a praseodymium element as 390.8 nm. Results thereof are illustrated in Table 2.

TABLE 2

| Experimental Example 1 | Experimental Example 4 | Experimental Example 5 | Experimental Example 6 |
|---|---|---|---|
| 293.5 ppm | 160 ppm | 163 ppm | 55.6 ppm |

Experimental Example 3

Measurement of High Potential Carbon Corrosion Durability of Cathode

In order to measure carbon corrosion durability by applying an MEA cathode high potential (1.4 V) using a catalyst of the embodiment example manufactured according to the present disclosure, a high potential cycle experiment was conducted under the conditions of 65° C., relative humidity (RH) of 100, 1 bar, and $H_2/N_2$. Here, the high potential cycle experiment was performed at 0.1 to 1.4 V, and 1.4 V exposure time was 5 minutes per cycle. Results thereof are illustrated in FIG.

Experimental Example 4

Measurement of CCV Durability

In order to measure open circuit voltage (CCV) durability of an MEA using a catalyst of the embodiment example manufactured according to the present disclosure, a CCV durability experiment was conducted under conditions at 85° C., relative humidity (RH) of 25, 1 bar, and $H_2$/air. Here, for performance comparison, performance evaluation was performed under the conditions at 55° C., relative humidity of 50, 1 bar, and $H_2$/air. Results thereof are illustrated in FIG. 7.

Experimental Example 5

Evaluation of Moisture Adsorption

Figure 3:
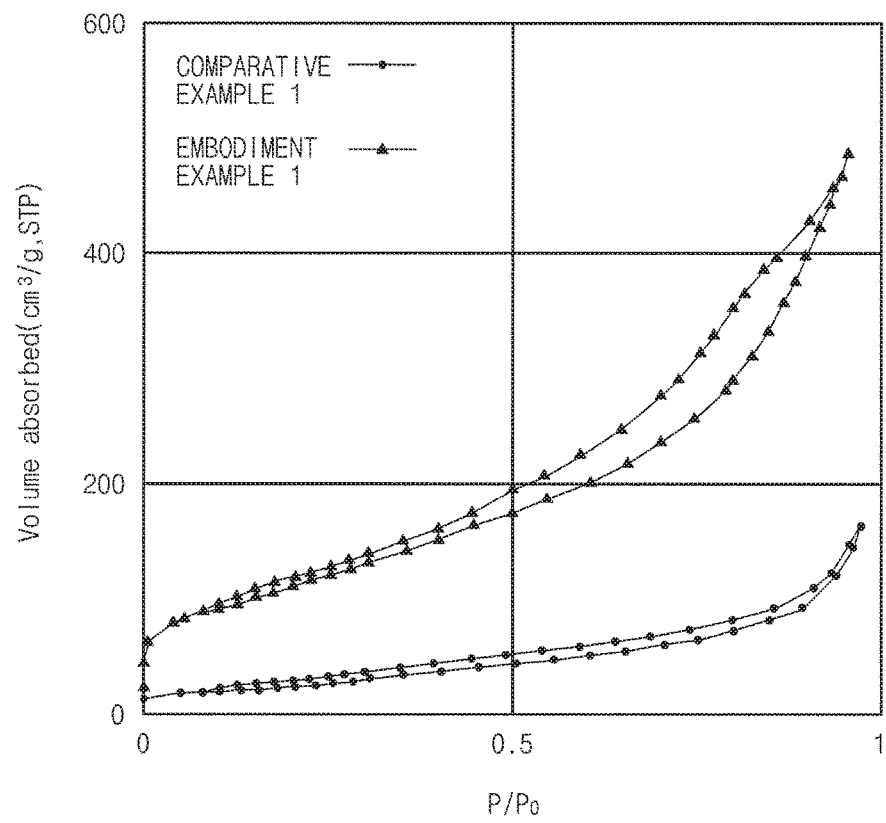
FIG. 3 is a graph of XRD analysis results illustrating a change in a specific surface area (BET) of a crystalline carbon support before and after high temperature heat treatment under a vapor atmosphere.
Figure 4:
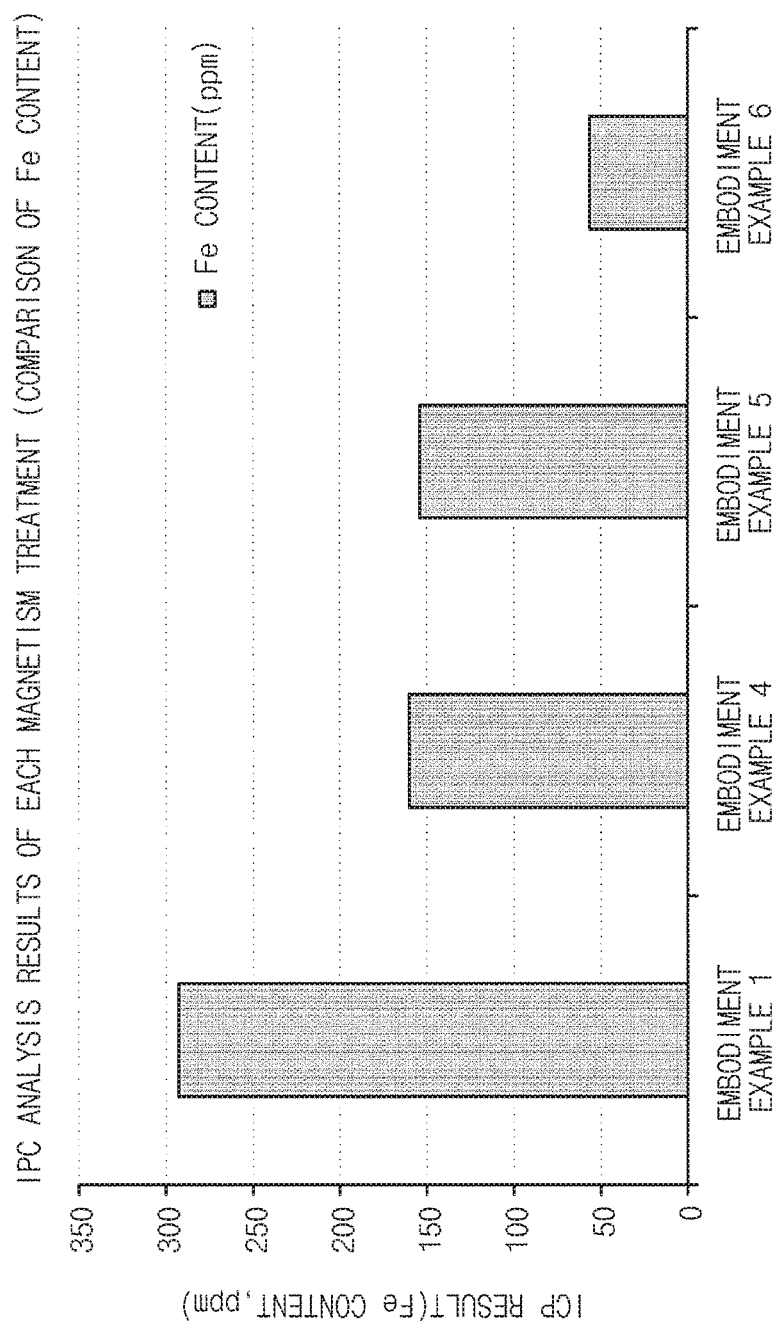
FIG. 4 is a graph of analysis results of an inductively coupled plasma (ICP) spectrometer of a carbon support processed by strength of magnetic field.
Figure 5:
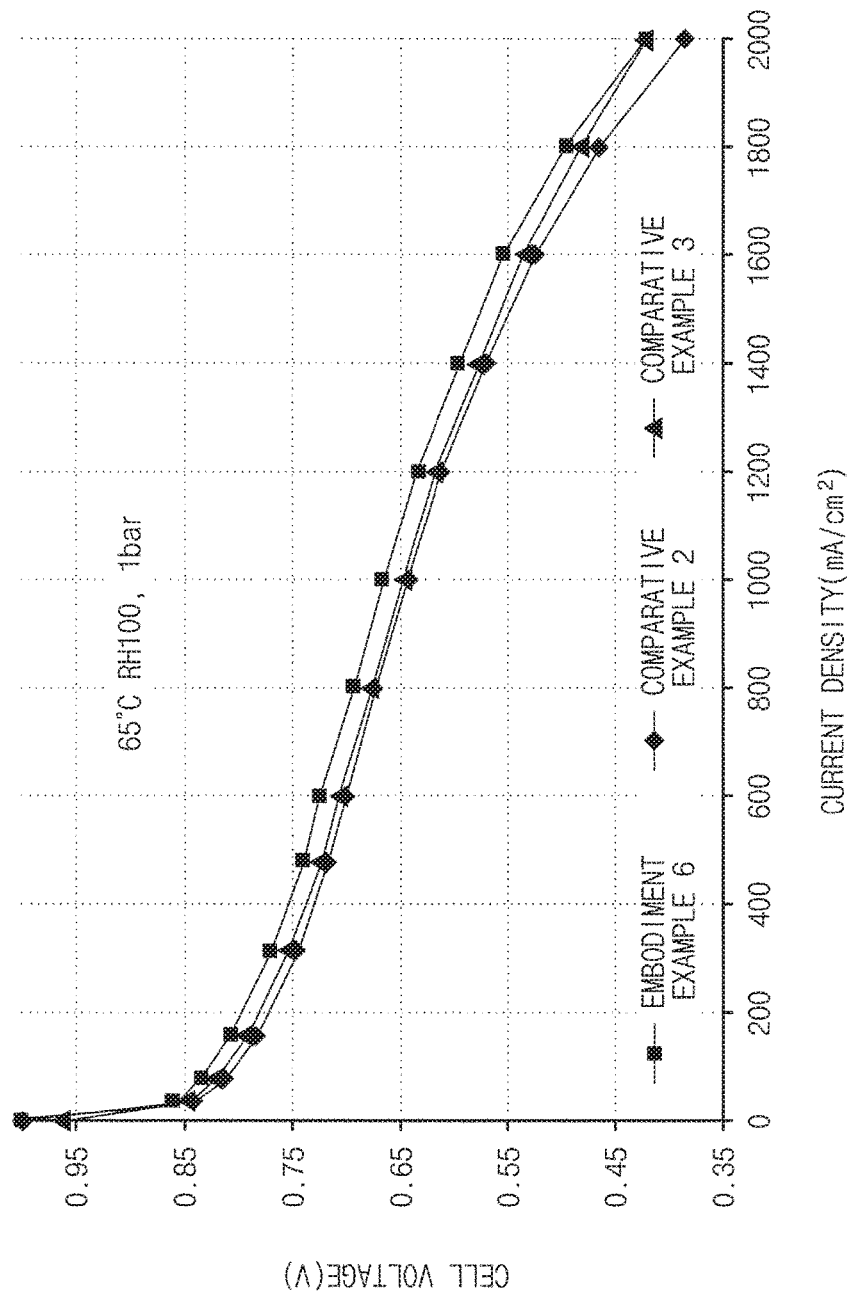
FIG. 5 is a graph of results obtained by evaluating cell performance using catalyst supports of exemplary embodiment and comparative example.
Figure 6:
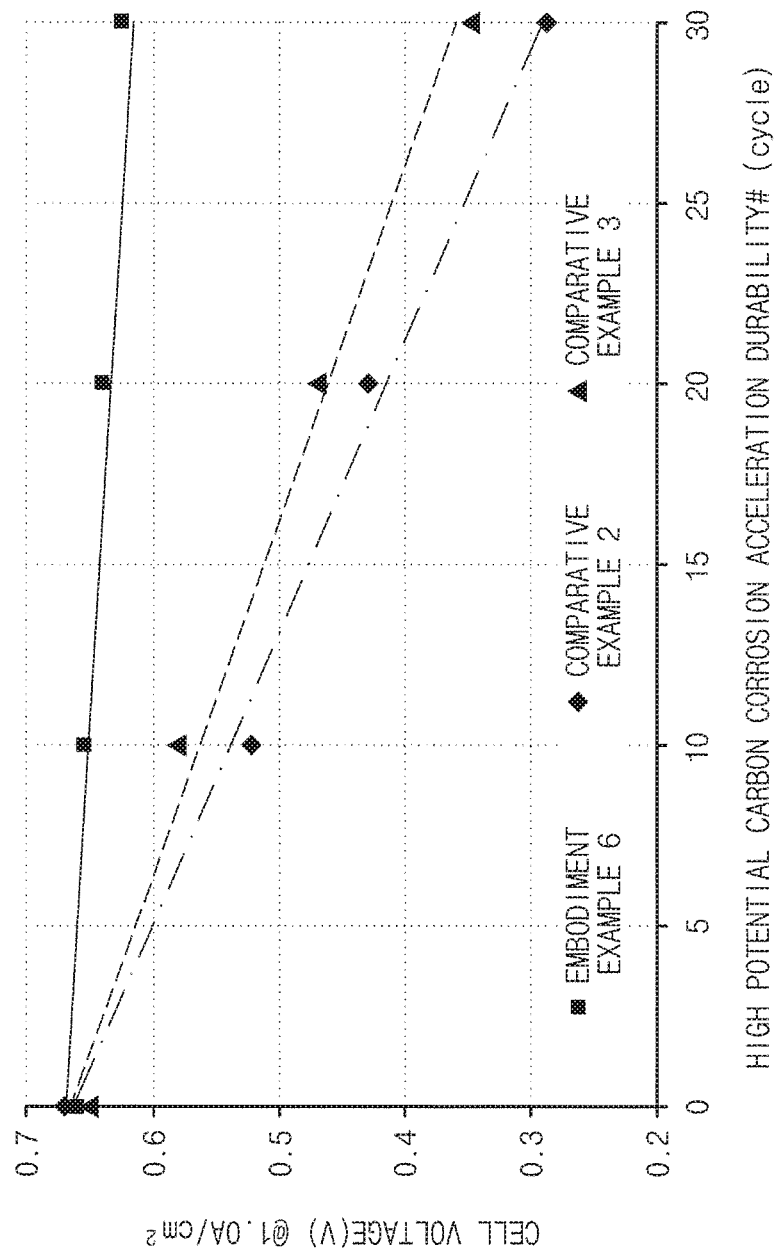
FIG. 6 is a graph of results obtained by evaluating carbon corrosion durability using catalyst supports of exemplary embodiment and comparative example.

Moisture adsorption isotherm/desorption isotherm analyses of embodiment examples manufactured according to the present disclosure and comparative examples were performed, and results thereof are illustrated in FIG. 3.

As described above, according to the method for manufacturing a catalyst support, a high specific surface area and high crystallinity, while maintaining excellent surface physical properties of a carbon support, may be implemented. Thus, carbon corrosion durability of the catalyst and performance of a fuel cell may be further enhanced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for manufacturing a catalyst support, the method comprising steps of:
heat-treating a crystalline carbon support in a temperature range from 700° C. to 1100° C. under a vapor atmosphere to increase a specific surface area of the carbon support; and
applying a magnetic field to the increased specific surface area of the carbon support to remove an impurity,
wherein a strength of the magnetic field ranges from 3,000 G to 40,000 G.

2. The method according to claim 1, wherein the specific surface area of the carbon support after heat treatment ranges from 200 to 700 m$^2$/g.

3. The method according to claim 1, wherein the vapor is supplied in an amount of 1 L/h to 30 L/h.

4. The method according to claim 1, wherein the heat treatment is performed for 8 to 15 hours.

5. The method according to claim 1, wherein the crystalline carbon support includes a carbon material selected from the group consisting of carbon black, active carbon, carbon nano-tube, carbon fiber, graphite, and graphite nano-fiber.

6. The method according to claim 1, wherein the crystalline carbon support includes a spherical carbon material having an average particle diameter ranging from 0.1 μm to 500 μm.

7. The method according to claim 1, wherein the crystalline carbon support includes a linear carbon material having an average diameter ranging from 1 nm to 200 nm and an average length ranging from 1 μm to 100 μm.

8. The method according to claim 1, wherein the impurity is selected from the group consisting of an Fe metal, an Ni metal, and an oxide having magnetism of the Fe metal and the Ni metal.

9. A catalyst support manufactured by a method comprising steps of:
heat-treating a crystalline carbon support in a temperature range from 700° C. to 1100° C. under a vapor atmosphere to increase a specific surface area of the carbon support; and
applying a magnetic field to the increased specific surface area of the carbon support to remove an impurity,
wherein a strength of the magnetic field ranges from 3,000 G to 40,000 G.

10. The catalyst support according to claim 9, wherein a specific surface area of the carbon support ranges from 200 m$^2$/g to 700 m$^2$/g.

11. The catalyst support according to claim 9, wherein the content of an impurity of the catalyst is 3 wt % or less of the entire weight of the catalyst support.

12. A catalyst for a fuel cell including the catalyst support of claim 9.

13. The catalyst of claim 12, wherein the catalyst includes: a carbon support and an active metal, and
wherein the active metal is included in an amount of 0.1 to 60 parts by weight over 100 parts by weight of the carbon support.

14. The catalyst of claim 13, wherein the active metal includes any one selected from the group consisting of platinum (Pt), ruthenium (Ru), tin (Sn), palladium (Pd), titanium (Ti), vanadium (V), chromium (Cr), manganese (Mn), iron (Fe), cobalt (Co), nickel (Ni), copper (Cu), zinc (Zn), aluminum (Al), molybdenum (Mo), selenium (Se), tungsten (W), iridium (Ir), osmium (Os), rhodium (Rh), niobium (Nb), tantalum (Ta), zirconium (Zr), and lead (Pb), and a mixture of two or more thereof.

15. An electrode including the catalyst for a fuel cell of claim 12.

16. A fuel cell including the electrode of claim 15.

* * * * *